United States Patent
Elbashir et al.

(10) Patent No.: US 12,128,388 B2
(45) Date of Patent: Oct. 29, 2024

(54) REGENERATION AND ACTIVATION OF CATALYSTS FOR CARBON AND SYNGAS PRODUCTION

(71) Applicant: Qatar Foundation for Education, Science and Community Development, Doha (QA)

(72) Inventors: Nimir O. Elbashir, Doha (QA); Mohamed Sufiyan A. Challiwala, Doha (QA); Hanif Ahmed Choudhury, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 652 days.

(21) Appl. No.: 17/437,524

(22) PCT Filed: Mar. 13, 2019

(86) PCT No.: PCT/QA2019/050005
§ 371 (c)(1),
(2) Date: Sep. 9, 2021

(87) PCT Pub. No.: WO2020/185107
PCT Pub. Date: Sep. 17, 2020

(65) Prior Publication Data
US 2023/0024777 A1    Jan. 26, 2023

(51) Int. Cl.
*B01J 23/94* (2006.01)
*B01J 38/02* (2006.01)
*B01J 38/04* (2006.01)
*B01J 38/20* (2006.01)
*C01B 3/40* (2006.01)

(52) U.S. Cl.
CPC ............... *B01J 23/94* (2013.01); *B01J 38/02* (2013.01); *B01J 38/04* (2013.01); *B01J 38/20* (2013.01);
(Continued)

(58) Field of Classification Search
CPC ... B01J 23/94; B01J 38/02; B01J 38/04; B01J 38/20; B01J 23/755; B01J 38/40;
(Continued)

(56) References Cited

U.S. PATENT DOCUMENTS

| 5,565,089 A | 10/1996 | Ramachandran et al. |
| 7,935,245 B2 * | 5/2011 | Towler ................. C10G 11/182 252/373 |

(Continued)

FOREIGN PATENT DOCUMENTS

| WO | 2018187213 A1 | 10/2018 | |
| WO | WO-2021125990 A1 * | 6/2021 | ............. B01J 21/04 |

OTHER PUBLICATIONS

Preliminary Report on Patentability for related International Application No. PCT/QA2019/050005; action dated Sep. 23, 2021; (8 pages).

(Continued)

*Primary Examiner* — Patricia L. Hailey
(74) *Attorney, Agent, or Firm* — K&L Gates LLP

(57) ABSTRACT

A method to regenerate and reactivate catalysts used for a carbon and syngas production reaction including a DRM or CARGEN reaction is developed. Carbon dioxide ($CO_2$) is used as the regeneration and activation media. This method of a single step regeneration and activation using $CO_2$ is more effective than the existing conventional two-step process that includes separate reduction and oxidation steps.

(Continued)

This method produces pure carbon monoxide (CO) as a byproduct from the regeneration process by utilizing $CO_2$ and carbon.

20 Claims, 7 Drawing Sheets

(52) U.S. Cl.
CPC ........ *C01B 3/40* (2013.01); *C01B 2203/0238* (2013.01); *C01B 2203/1058* (2013.01); *C01B 2203/141* (2013.01)

(58) Field of Classification Search
CPC .............. C01B 3/40; C01B 2203/0238; C01B 2203/1058; C01B 2203/141
USPC .............................. 502/39, 42, 337; 208/133
See application file for complete search history.

(56) References Cited

U.S. PATENT DOCUMENTS

| | | |
|---|---|---|
| 2004/0082670 A1 | 4/2004 | Cnossen et al. |
| 2015/0018438 A1 | 1/2015 | Ha et al. |

OTHER PUBLICATIONS

International Search Report for related International Application No. PCT/QA2019/050005; report dated Sep. 17, 2020; (2 pages).
Written Opinion for related International Application No. PCT/QA2019/050005; report dated Sep. 17, 2020; (6 pages).
De Vasconcelos, et al.; "Regeneration study of Ni/hydroxyapatite spent catalyst from dry reforming"; Oct. 12, 2018; [Retrieved Jul. 21, 2020] Retrieved from Internet URL:<https://hal.archives-ouvertes.fr/hal-01700646/document>.
Fidalgo, et al.; "Microwave-assisted dry reforming of methane"; Aug. 2008; International Journal of Hydrogen Energy; vol. 33, Issue 16; (2 pages).
Bruna Rego De Vasconcelos, et al.; "Regeneration study of Ni/hydroxyapatite spent catalyst from dry reforming"; Jul. 15, 2018; vol. 310; Science Direct; (7 pages).
Office Action for related Chinese Application No. 201980094009.4; action dated Dec. 11, 2023; (8 pages).
Alenazey; "Utilizing carbon dioxide as a regenerative agent in methane dry reforming to improve hydrogen production and catalyst activity and longevity"; ScienceDirect; 2014; (17 pages).
Office Action and English translation for related Chinese Application No. 201980094009.4; action dated May 14, 2024; (22 pages).

\* cited by examiner

REGENERATION AND ACTIVATION OF CATALYSTS FOR CARBON AND SYNGAS PRODUCTION

CROSS-REFERENCE TO RELATED APPLICATIONS

This application is a National Stage filing under 35 U.S.C. 371 of International Application No. PCT/QA2019/050005, filed on Mar. 13, 2019, which is hereby incorporated by reference in its entirety for all purposes.

BACKGROUND

Industrial processes for conversion of organic compounds (e.g., natural gas, which is composed primarily of methane) to synthesis gas (or "syngas") using an oxidant includes reforming of methane. Dry Reforming of Methane (DRM) is a catalytic reaction and one of the many pathways for chemical conversion of $CO_2$ to valuable products via reaction with methane to produce syngas (a mixture of CO and hydrogen ($H_2$)). Syngas is a precursor for the production of value-added chemicals, and ultra clean fuels via several chemistries, including but not limited to, Fischer Tropsch Synthesis (FTS) reaction. In contrast to other reforming processes, such as Steam Reforming and Partial Oxidation Reforming, which utilizes other oxidants, steam and oxygen, this process is unique as it utilizes two greenhouse gases ($CH_4$ and $CO_2$) to produce syngas.

The following stoichiometric equations describe these processes:

Steam reforming of $CH_4$ (SRM):

$$CH_4 + H_2O \rightarrow CO + 3H_2 \qquad (eq.1)$$

Partial Oxidation of $CH_4$ (POX):

$$CH_4 + \frac{1}{2}O_2 \rightarrow CO + 2H_2 \qquad (eq.\ 2)$$

Dry Reforming of Methane (DRM):

$$CH_4 + CO_2 \rightarrow 2CO + 2H_2 \qquad (eq.3)$$

DRM is an attractive route for $CO_2$ conversion to reduce greenhouse gas emissions. However, this process faces major challenges towards its commercialization. Among them is the higher endothermicity than the known SRM, low quality syngas yield ratio, i.e., hydrogen:carbon monoxide ($H_2$:CO) ratio, and the rapid formation of solid carbon ("coke") on the catalyst active sites and surface. The rapid formation of solid carbon is the most challenging issue. Solid carbon formation clogs the active sites and rapidly deactivates the catalyst. During DRM reaction specifically at low temperature conditions (450° C.-600° C.), coke formation on active site of the catalyst is more favorable, which causes rapid deactivation due to inaccessibility of the active sites.

In essence, methane decomposition and Boudouard reactions (disintegration of carbon monoxide to carbon dioxide and coke) at the typical DRM conditions compete with the desired formation of syngas to form solid carbon. Given this, DRM reaction is not industrially attractive unless a novel technique is implemented that could either offer longer catalyst life, or provide an efficient catalyst regeneration process.

There are limited literatures published in the field of DRM catalyst regeneration. For instance, the work reported in literature on the subject by Condrasky et al. ("Process for reactivating a reforming catalyst" 1971) provided a method for reactivating a catalyst by steps involving oxidation with 2% $O_2$ followed by reduction with $H_2$ gas. A study by Innes et al. ("Low temperature regeneration of coke deactivated reforming catalysts" 1992) proposed the utilization of halogen free oxygen containing gas at a temperature less than 416° C. for regeneration of a reforming catalyst composed of Pt on L-Zeolite molecular sieve.

Similarly, a study by Sechrist et al. ("Regeneration method with reduced catalyst heat exposure" 1989) proposed a regeneration process for coke contaminated catalyst particles by confining the coke particles in a combustion section of a regeneration zone to a tapered bed configuration. The authors claim that utilization of $O_2$ is more, and surface area loss of catalyst could be significantly reduced. A previous work by Fung et al. ("Regeneration of severely deactivated reforming catalysts" 1998) proposed a method that involves contacting a mixture of inert gas, oxygen and water at elevated temperatures (400-600° C.) followed by treatment with a chemical containing source of chlorine (HCl, or $Cl_2$ etc.). In this, the authors claim enhancement in dispersion of a re-activated catalyst comprising of L-Zeolite compound.

Yet another work by Mamedov et al. ("Process for increasing the carbon monoxide content of a syngas mixture" 2016) proposed a process for the DRM catalyst regeneration utilizing a gas mixture composed of $CO_2$, hydrogen and water to increase CO content of the gas mixture. The objective of the authors was to utilize the benefit of reverse water gas shift (WGS) reaction to convert $CO_2$ to CO by using excess hydrogen in the system. On a different note, a study by Mahamulkar et al. 2016 ("Formation and oxidation/gasification of carbonaceous deposits: a review" Industrial & Engineering Chemistry Research 55(37): 9760-9818) provided a review of different techniques to oxidize carbon deposits formed on a catalyst surface during hydrocarbon treatments. The authors in this study discuss about the mechanism and different conditions that help in reactivating such catalysts.

In a study by Santos et al. 2008 ("Mechanistic insights of $CO_2$-coke reaction during the regeneration step of the fluid cracking catalyst," Applied Catalysis A: General, 2008. 336(1): p. 40-47), the authors provided a mechanistic insight of a coked Fluid Catalytic Cracking (FCC) catalyst regeneration under different environments of $O_2$ in He and $CO_2$ in He over a range of temperature (starting from room temperature all the way to 1000° C.). Specifically, the authors studied the regeneration of a coked fluid catalytic cracking catalyst in $O_2$/He and $CO_2$/He atmospheres using online mass spectroscopy. The $CO_2$ molecule reacts dissociatively, while introducing oxygen functionality into the coke. These species are decomposed at a high temperature forming CO, and no water is observed during the $CO_2$-coke reaction. This work is in context of fluid catalytic cracking catalyst.

Similarly, a study by Abdelsadek et al. ("In-situ hydrogasification/regeneration of NiAl-hydrotalcite derived catalyst in the reaction of $CO_2$ reforming of methane: A versatile approach to catalyst recycling," Journal of $CO_2$ Utilization, 2016. 14: p. 98-105) utilized hydrogen gas for regeneration of a coked DRM catalyst. The reaction of adsorbed carbon with hydrogen produced methane gas. Their results after each recycle also showed significant improvement in both $CH_4$ and $CO_2$ conversions. Specifically, the catalyst was subjected to in-situ hydrogasification conditions to promote regeneration followed by a second DRM cycle. An increase of 15.7% in the conversion of $CH_4$ and 17.3% in the conversion of $CO_2$ was attained, while the ratio of resulting $H_2/CO$ was augmented by 14%. The ratio of $H_2$ consumed over the course of two hours hydrogasification to that generated over ten hours of DRM was 9.6%. The small particle sizes of resulting $Ni^0$ species as well as their high stability were both key factors contributing to the increase in the amount of Hz/CO produced prior to and after regeneration. In this article, the authors propose to utilize an approach to promote in-situ catalyst regeneration during the reaction itself by increasing the concentration of $CO_2$ in the reaction mixture.

As coke formation is an inherent process challenge for gas oil hydrocracking in a typical refinery, and for large size FCC units, a study by Pereira et al. ("Catalyst regeneration using $CO_2$ as reactant through reverse-Boudouard reaction with coke," Greenhouse Gases: Science and Technology, 2017. 7(5): p. 843-851) suggested an interesting technique of utilizing a combination of $CO_2$ and $O_2$ gases to "burn" off the coke produced on catalyst surface. They suggested that $CO_2$ could be activated in a site composed of V—O (group I or II) in coke proximity under FCC operating conditions. Specifically, the reverse-Boudouard reaction was being performed in a $CO_2/O_2$ atmosphere and under fluid catalytic cracking regeneration conditions. This approach can contribute to $CO_2$ emissions reduction. Alumina modified by either sodium or calcium and vanadium revealed a synergism that favored the $CO_2$ activation for reverse-Boudouard reaction. Also, this catalyst effect in reverse-Boudouard reaction is extended to alumina catalysts containing Li, Na, K, and Ca in the presence of vanadium. Moreover, the reverse-Boudouard activation energy was independent of the Group I and II elements when vanadium was present; therefore, vanadium plays the main role in the activation of $CO_2$ for the reaction. This work is in the context of FCC catalyst only. Also, the authors are advocating for Group I or Group II metal addition for $CO_2$ activation.

Another work by Pereira et al. ("Vanadium-lithium alumina a potential additive for coke oxidation by $CO_2$ in the presence of $O_2$ during FCC catalyst regeneration," *Applied Catalysis B: Environmental*, 2016. 196: p. 117-126) discussed the prospects of utilization of $CO_2$ in $O_2$ atmosphere for auto-thermal operation of an FCC unit. According to this work, the possibility of performing the regeneration of spent FCC catalysts in rich $CO_2$ atmosphere can simultaneously reduce greenhouse gas emissions and produce CO for sequential uses. The alumina modified by vanadium and lithium revealed a remarkable catalyst (or additive) for this goal. High $CO_2$ conversion was observed in the presence of helium. For instance, at 720 and 800° C., 39 and 76% of $CO_2$ was converted during the first 5 min of reaction respectively, and it was reduced by less than 5% in the presence of oxygen. Moreover, the catalyst works effectively regardless the coke type on the spent catalyst, i.e. produced by means of hydrocarbon or bio feed cracking.

The same authors also conducted a very comprehensive experiment to unambiguously demonstrate that catalyst regeneration can be auto-thermally conducted by energy integration within an FCC unit to produce CO from coked catalyst. The authors reported in "Vanadium-potassium-alumina catalyst: A way of promoting $CO_2$ and coke reaction in the presence of $O_2$ during the FCC catalyst regeneration" (*Catalysis Communications* 2014, 51, 42-45) that alumina (usually present in 20-40 wt. % in the catalyst composition) modified by both potassium (5 wt. %) and vanadium (1 wt. %) was able to perform the goal therein under regular regeneration conditions, i.e. at 700° C. The apparent activation energy values for $CO_2$ and coke reaction on alumina, alumina with potassium and with both potassium and vanadium were 349, 249 and 192 kJ/mol respectively. In the presence of $^{13}CO_2$ and $O_2$, the primary observed product was $^{13}CO$, followed by $^{12}CO$ and then by $^{12}CO_2$. These results unambiguously demonstrate that the stage of catalyst regeneration can be kept under heat balance and simultaneously produce a huge amount of CO and therefore, mitigate $CO_2$ emission.

In a second study by the same group ("Vanadium and alumina modified with groups I and II elements for $CO_2$ and coke reaction under fluid catalytic cracking process. *Applied Catalysis B: Environmental*, 2015. 164: p. 225-233), the authors utilized a set of different catalyst materials (alumina modified by vanadium and potassium with active metal comprising of lithium, sodium, potassium, magnesium and calcium) to prove the same concept. Specifically, the authors investigated catalysts comprising of alumina modified by Li, Na, K, Mg and Ca. The modified alumina catalysts were active for the reverse-Boudouard reaction in the order of K>Mg, Li>Ca>Na>pristine alumina. Alumina modified by vanadium and potassium was also studied and revealed a remarkably active catalyst under $O_2$ atmosphere as well as for the reverse-Boudouard reaction. For instance, at 720° C., 50% of $CO_2$ was converted to CO, and 90% at 800° C.

In same context of FCC unit, another study by Alenazey et al. 2009 ("Coke removal from deactivated Co—Ni steam reforming catalyst using different gasifying agents: An analysis of the gas-solid reaction kinetics," *Catalysis Communications*, 2009. 10(4): p. 406-411) conducted a series of tests by using different oxidizer gases for regeneration of a spent Co—Ni catalyst. Their study concluded that carbon removal process is independent of the gasifying agent, and decreases in order of $O_2$>Air>$CO_2$>$H_2$>$N_2$. They also conducted a mechanistic study to support their analysis. Specifically, they investigated the reactivity of various gases, namely, $O_2$, air, $CO_2$, $H_2$, and $N_2$, with carbon deposited on alumina-supported Co—Ni catalyst during propane reforming in a fluidized bed reactor at 773-973K using relatively low feed steam:carbon ratio (0.8-1.5) in a thermogravimetric analysis (TGA) unit. Analysis of the transient solid weight loss revealed that carbon removal mechanism is dependent on the type of gasifying agent. Specific reaction rates from these phenomenological models were linearly correlated with the catalyst carbon content with reactivity coefficient of the gasifying agent decreasing in the order of $O_2$>air>$CO_2$>$H_2$>$N_2$. In order to minimize energy consumption during catalyst regeneration, reduce greenhouse gas emissions and reduce catalyst sintering, it would be desirable to employ a mixture of air and $CO_2$ as the carbon gasifying agent to take advantage of the coupled exothermic (air oxidation) and endothermic (reverse Boudouard reaction involving $CO_2$ and carbon) nature taking place during the carbon removal operation. This work recommends utilizing air and $CO_2$ mixture for exothermic oxidation of coke from fluidized bed reactor for propane reforming reaction.

Fidalgo et al. ("Microwave-assisted Dry reforming of methane" (*International Journal of Hydrogen Energy*, Vol. 33, Issue 16, August 2008, 4337-4344) merely concerns to conduct DRM reaction and not catalyst regeneration reaction. This article requires the use of microwave as a heating source to conduct the reaction, not direct heating in a furnace. This article discloses that "[c]arbonaceous deposits from $CH_4$ decomposition are gasified by $CO_2$ and, as a result, active centers for the dry reforming reaction are constantly regenerated," which implies there is a reaction between carbonaceous deposits and $CO_2$ during the course of the DRM reaction. However, the indicated reaction is actually one of the mechanistic steps involved in the DRM reaction. The authors suggested conducting DRM reaction in a temperature range of 700 to 800° C. with the help of microwave technology and also "[increasing] the concentration of $CO_2$ in reaction mixture" to improve the conversion and stability.

Mahamulkar et al. ("Formation and Oxidation/Gasification of Carbonaceous Deposits: A Review" (*Ind. Eng. Chem. Res.* 2016, 55, 9760-9818) discusses oxidation or gasification of various forms of carbon deposits, along with the techniques used to study the mechanism of oxidation/gasification. The kinetics of catalytic and non-catalytic carbon oxidation is described. The effect of reactive gases such as NOx, water vapor, CO2, and SO2 on the gasification behavior of carbon deposits is also discussed. Reaction rates of oxidation/gasification of carbon under different operating conditions have been calculated, allowing for a comprehensive Overview of carbon removal reactivity. This article discusses the chemistry and mechanism of coke oxidation in general.

Ramachandran et al. (U.S. Pat. No. 5,565,089) describes catalyst regeneration in a Fluid Catalytic Cracking process. However, it provides a technique for utilizing the benefit of heat transfer capability of $CO_2$ while treating it as an inert in the process and not actually using it as a regenerate reactant gas. In FCC process, the catalysts are generally zeolites of different concentrations of alumina and silica, which are oxides of the metals and non-metals. Metals and non-metal oxides such as alumina and silica in their higher oxidation states are used as catalyst. Regeneration of spent FCC catalyst by air or pure oxygen stream will only burn off the coke on the catalyst to produce $CO_2$ without affecting the oxidation state of the catalyst. Moreover, this literature proposes the combustion reaction, namely, the reaction of carbon with oxygen to form carbon dioxide, as the regeneration reaction rather than $CO_2$ reaction with carbon (Carbon+$CO_2 \rightarrow 2$ CO) to produce carbon monoxide.

SUMMARY

The present application provides a unique approach to regenerate a spent DRM catalyst utilizing $CO_2$.

One embodiment relates to a method of regenerating or reactivating a catalyst used in a reforming reaction, the method comprising: providing the catalyst in a reactor, wherein the catalyst was used in a carbon and syngas production reaction; and providing a first oxidizing gas comprising $CO_2$ to the reactor for regeneration or reactivation of the catalyst, wherein the catalyst is not further reduced for the regeneration or reactivation of the catalyst.

In another embodiment, the carbon and syngas production reaction is a Dry Reforming of Methane reaction or a CARGEN reaction, and the catalyst comprises solid carbon from the Dry Reforming of Methane reaction or the CARGEN reaction.

In another embodiment, the catalyst comprises nickel as an active metal.

In another embodiment, the catalyst is deactivated from the carbon and syngas production reaction or has an activity less than that before being used in the carbon and syngas production reaction.

Yet another embodiment further comprises providing to the reactor a second oxidizing gas comprising $CO_2$ and $O_2$ for the regeneration or reactivation of the catalyst.

Yet another embodiment further comprises producing pure CO from the regeneration or reactivation of the catalyst.

In yet another embodiment, the regeneration or reactivation of the catalyst is conducted at a temperature from about 650° C. to about 900° C.

In yet another embodiment, the regeneration or reactivation of the catalyst has a duration from about 10 minutes to about 4 hours or until the CO generation diminishes to zero while regeneration or reactivation.

Another embodiment relates to a process comprising: providing a first catalyst in a first reactor for a first carbon and syngas production reaction; providing a first mixed gas comprising $CH_4$ and $CO_2$ in the first reactor for the first carbon and syngas production reaction; allowing a first reacted gas from the first carbon and syngas production reaction to leave the first reactor; and providing a first oxidizing gas comprising $CO_2$ to the first reactor for a first regeneration or reactivation of the first catalyst, wherein the first catalyst is not further reduced for the first regeneration or reactivation of the first catalyst.

In another embodiment, the first carbon and syngas production reaction is a first Dry Reforming of Methane reaction or a first CARGEN reaction.

Another embodiment further comprises providing a second catalyst in a second reactor for a second carbon and syngas production reaction; providing a second mixed gas comprising $CH_4$ and $CO_2$ in the second reactor for the second carbon and syngas production reaction; allowing a second reacted gas from the second carbon and syngas production reaction to leave the second reactor; and providing a second oxidizing gas comprising $CO_2$ to the second reactor for a second regeneration or reactivation of the first catalyst, wherein the second catalyst is not further reduced for the second regeneration or reactivation of the second catalyst.

In another embodiment, the first carbon and syngas production reaction is a first Dry Reforming of Methane reaction or a first CARGEN reaction.

In yet another embodiment, the first regeneration reaction of the first catalyst and the second Dry Reforming of Methane reaction are about concurrent.

The present invention solves the problem of regenerating or reactivating a catalyst used in a reforming reaction, particularly, a spent catalyst used in a Dry Reforming of Methane reaction. The present invention solves the problem by a single step regeneration and activation using $CO_2$ as an oxidant, which not only reduces the number of steps required during regeneration, but also serves as a process to produce CO. This is more effective and efficient than the conventional two-step process that includes separate reduction and oxidation steps. The present invention produces pure carbon monoxide (CO) as a byproduct from the regeneration process by utilizing $CO_2$ and carbon.

BRIEF DESCRIPTION OF DRAWINGS

Features and advantages of the invention described herein may be better understood by reference to the accompanying drawings in which.

Figure 1:
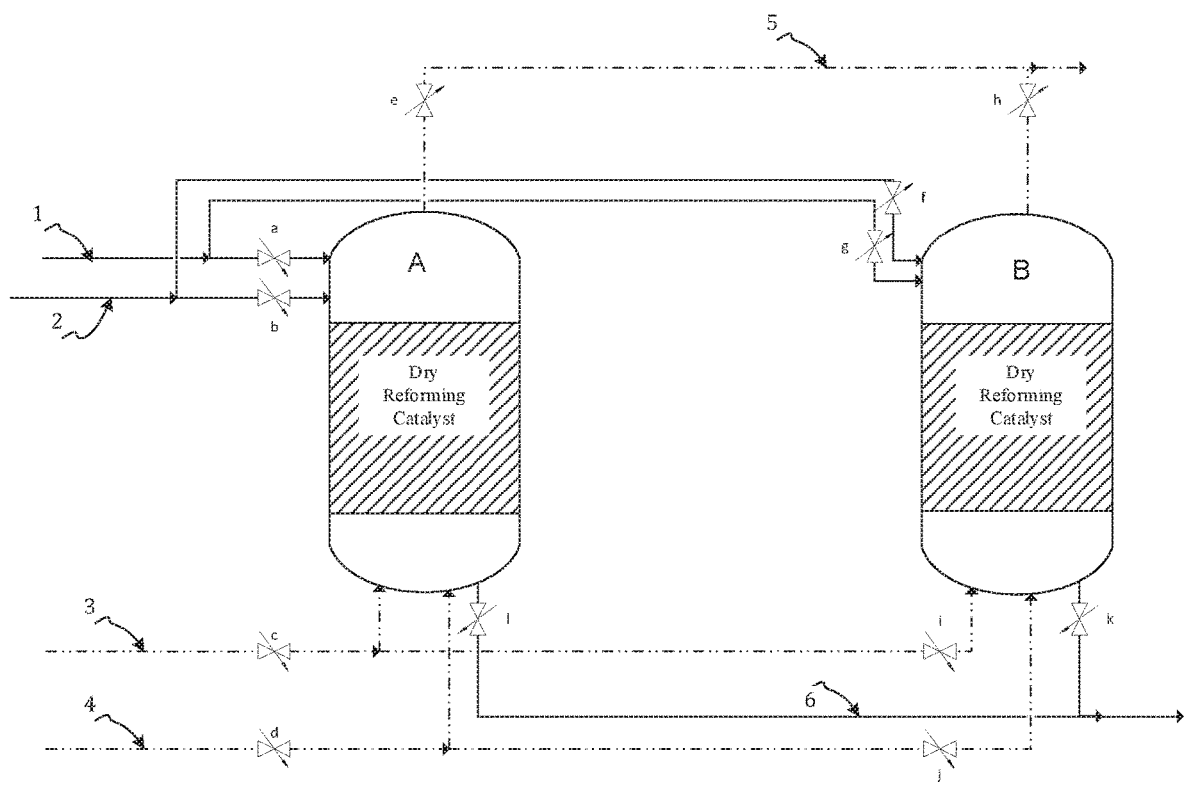
FIG. 1 shows the DRM Catalyst Regeneration Protocol.

The reader will appreciate the foregoing details, as well as others, upon considering the following detailed description of certain non-limiting embodiments according to the present disclosure.

DETAILED DESCRIPTION

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

The present invention provides a novel solution for systematic handling of carbon deposited on the catalyst surface by regenerating and reactivating the spent catalysts, e.g., the spent DRM catalyst. The uniqueness of this novel solution is that it utilizes $CO_2$ as a reactant and also as a regeneration/activation media for the catalyst. The present invention uses a single step process involving utilization of $CO_2$ to oxidize solid carbon.

The present invention utilizes the benefit of the reaction of coke with pure $CO_2$ to remove coke from the catalyst surface and to provide a systematic procedure for the regeneration process of the spent catalyst. In particular, the present invention relates to a procedure that involves sequential utilization of a pure $CO_2$ gas followed by an optional step of brief exposure with a mixture of $CO_2$ and $O_2$ to produce CO from solid carbon trapped on catalyst surface. The present invention provides a unique method to in-situ regenerate a spent catalyst without unloading the catalyst material from the reactor.

In the present invention, $CO_2$-Temperature Programmed Oxidation ($CO_2$-TPO) is used to "burn off" coke produced during a carbon and syngas production reaction, e.g., a DRM reaction, at a temperature from about 650° C. to about 900° C. to regenerate or reactivate the catalyst. This process utilizes the "soft oxidant" tendency of $CO_2$ to selectively oxidize carbon without affecting catalyst morphology and oxidation state. Oxidation of solid carbon entrapped on the catalyst surface using $CO_2$ does not oxidize the catalyst while oxidizing the solid carbon to produce the valuable CO product. This is beneficial not only in terms of saving expensive pure oxygen used during TPO, but also revenue savings in terms of $H_2$, which is required to reduce the catalyst back to its active metallic zero state. In addition, the present invention significantly reduces the downtime associated with catalyst regeneration that may include the two step regeneration ($O_2$-TPO followed by $H_2$ assisted reduction reaction).

Thus, the novel $CO_2$-TPO technique according to the present invention tremendously helps in saving carbon credits that may be wasted for $H_2$ and $O_2$ production in a plant and during catalyst regeneration. The present invention is unique in terms of its applicability to the domain of DRM, as well as a Carbon Generator Reactor (CARGEN) process reported in the inventors' patent application PCT/US2018/025696, which claims priority to U.S. provisional application No. 62/481,100, both incorporated herein by their entirety. In addition to the benefit of catalyst regeneration, this method can also be employed for CO production from solid coke produced by DRM.

As detailed in PCT/US2018/025696, the inventors developed a system and method for producing carbon and syngas from carbon dioxide $CO_2$. The system includes a first reactor for carbon dioxide $CO_2$ and methane conversion to solid carbon, i.e., the Carbon Generator Reactor (CARGEN), and a second reactor for producing syngas. The second reactor can use dry reforming, steam reforming, and/or partial oxidation reforming to produce the syngas. This technique aims to maximize $CO_2$ fixation by optimization of the operating conditions, which could maximize carbon formation in the first reactor, i.e., the Carbon Generator Reactor (CARGEN), in the limited presence of oxygen to drive the reaction auto-thermally. The catalyst used in the CARGEN process can be regenerated or reactivated using the present invention.

For DRM, essentially an endothermic process, the present invention relates to a method for catalyst regeneration that enables successful commercialization of the DRM process. The present invention also enhances the overall $CO_2$ consumption in the process apart from being only utilized in stoichiometric quantity in the DRM reaction. In addition, the process is also an alternative route to produce CO, which is a valuable chemical commodity. The present invention can aide in further enhancing the efficiency of the DRM process, as $CO_2$ is not only used as a reactant, but also during catalyst regeneration cycle.

In contrast to a conventional catalyst regeneration process, which involves two steps (oxidation using pure $O_2$ followed by reduction with pure $H_2$), the present invention requires a single oxidation step by $CO_2$, as it selectively oxidizes the carbon without effecting the metal active site reduction state. Additionally, the present invention produces high purity CO from both $CO_2$ and carbon deposited on the catalyst surface. The present invention also saves energy compared to existing regeneration methods because it requires neither pure $O_2$ produced from the expensive air separation unit nor $H_2$ which is obtained from other sources.

In some embodiments of the present invention, a dual reactor configuration is used to facilitate simultaneous operation and maintenance cycles. As illustrated in the FIGS. 1 and 2, a reactor bed comprises of inlet for reactant gases from the top, whereas regeneration gases comprising of $CO_2$ and $O_2$ flow from the bottom of the reactor. This invention relates to a DRM reaction, including the novel Carbon Generator (CARGEN) process reported in the inventors' patent application PCT/US2018/025696, which claims priority to U.S. provisional application No. 62/481,100, both incorporated herein by their entirety.

Figure 2:
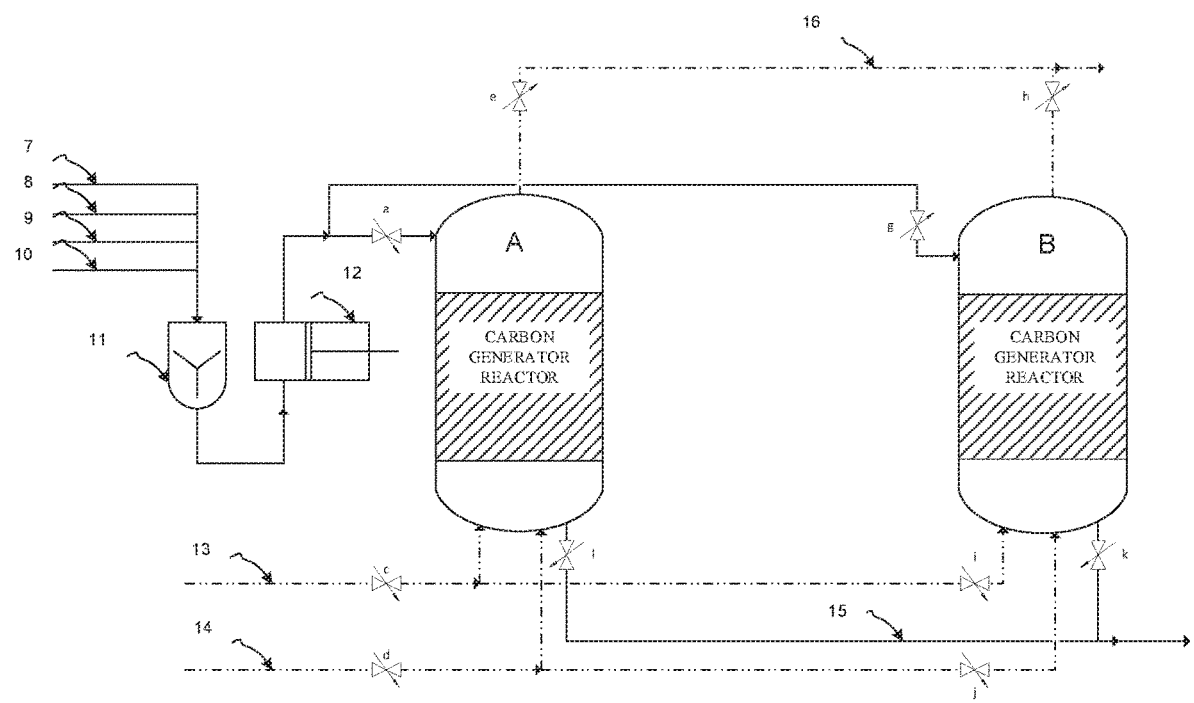
FIG. 2 shows the Carbon Generator Reactor Catalyst Regeneration Protocol.

The references numerals in FIGS. 1 and 2 are listed below:

| FIG. 1 DRM Process Flow Diagram | | FIG. 2 CARGEN Process | |
|---|---|---|---|
| Reference Numerals | Description | Reference Numerals | Description |
| 1 | $CH_4$ gas | 7 | $CH_4$ gas |
| 2 | $CO_2$ gas | 8 | $CO_2$ gas |
| 3 | $CO_2$ gas for regeneration | 9 | $O_2$ gas (optional) |
| 4 | $O_2$ gas for regeneration | 10 | Steam (optional) |
| 5 | CO product gas with unreacted $CO_2$ | 11 | Mixer |
| 6 | Syngas with unreacted $CH_4$ and $CO_2$ | 12 | Compressor |
| a-k | Non-return valves | 13 | $CO_2$ gas for regeneration |
| | | 14 | $O_2$ gas for regeneration |
| | | 15 | Syngas with unreacted $CH_4$ and $CO_2$ |
| | | 16 | CO and unreacted $CO_2$ |
| | | a-k | Non-return valves |

As for DRM reaction shown in FIG. 1, the reactant gases comprising of $CH_4$ and $CO_2$ flow into the reactor from the top, and the reaction happens at the catalyst bed. The catalyst mainly comprises of an active Nickel metal supported on Alumina or Silica. As the reaction proceeds, syngas is produced and leaves from the bottom of the reactor along with unreacted gases, while carbon gets deposited at the surface of the catalyst bed. When catalyst activity decreases due to coke formation, the $CO_2$ gas flows into the reactor from the bottom of the reactor. $CO_2$ preferentially reacts with carbon deposited to produce CO as per the following reaction:

$$CO_2 + Carbon \rightarrow 2CO \quad (eq. 4)$$

The CO produced during the regeneration process leaves from the top of the reactor. For a continuous operation, the two beds are connected in such a manner that when valves a and b are open during operation cycle of bed A, the valves i and j are open for regeneration cycle of bed B. Similarly, the product gases (comprising of syngas and unreacted gases) from bed A leave by valve l, while CO leaves from the top of the bed B by valve h. This process is repeated when bed B is under operation, and bed A is under regeneration cycle; however, different valve sets are operated for this combination.

As for the CARGEN reactor shown in FIG. 2, the only difference is in terms of the feed composition (feed comprising of $CO_2$, $O_2$, $CH_4$ and $H_2O$). As the CARGEN reaction takes place preferably at high pressure conditions (approx. 25 bar), the reactant gases are first compressed in a compressor house 12 and then sent to the reactor bed. The operation of the two beds under reaction and regeneration cycles is identical to the first case of the DRM reactor (FIG. 1) discussed earlier.

The catalysts used in processes such as CARGEN or DRM are exclusively transition metals (d-block elements) in their metallic states (oxidation state=0) only. These d-block elements at their reduced state (oxidation state=0) are susceptible to oxidation leading to an inactive state for either DRM or CARGEN reactions. Therefore, utilization of either air or pure oxygen stream for regeneration of the catalyst will essentially oxidize the active element present in the catalyst and will cease the process. An additional step of regeneration with $H_2$ stream will therefore be necessary for such oxidized catalyst. The catalysts of the Reforming (in particular, the DRM and CARGEN processes) can include active metals, such as nickel, copper, iron, palladium, platinum, rhodium etc., in different concentrations, including pure metals. Any catalyst suitable for the Reforming, particularly, the DRM and CARGEN processes, can be used.

If oxygen is used as a regenerate gas, then the active metal would be completely oxidized and will become inactive during the reaction. On the other hand, the present invention can use pure $CO_2$ to protect the catalyst from oxidation that would further require reduction. However, the process according to the present invention is a single step regeneration process.

The inventors developed a thermodynamic equilibrium model to determine a suitable operational condition to identify the feasibility of the regeneration reaction (eqn. 4).

The feasibility of the regeneration procedure according to the present invention is demonstrated below using thermodynamic equilibrium calculations. The thermodynamic calculations accounted for the Gibbs Free Energy of the system at the operating conditions of the present invention. The Gibbs Free Energy is essentially the energy available in the system to conduct an external work and is a measure of thermodynamic equilibrium as the free energy available in the system is minimum at equilibrium. Therefore, this calculation requires "minimizing" or search for local minima of the system at a given set of operating conditions (e.g., temperature, pressure and mole composition of the feed to the system). In the inventors' previous publications (Challiwala et al. (2017), "A combined thermo-kinetic analysis of various methane reforming technologies: Comparison with dry reforming" *Journal of $CO_2$ Utilization* 17: 99-111; and Challiwala et al. (2017), "A Process Integration Approach to the Optimization of $CO_2$ Utilization via Tri-Reforming of Methane" *Computer Aided Chemical Engineering*. A. Espuña, M. Graells and L. Puigjaner, Elsevier. 40: 1993-1998), the inventors provided a detailed description of a stepwise procedure for this calculation. The following is a brief calculation procedure.

The overall Gibbs free energy of the system is given by:

$$G^T = \Sigma_{i=1}^{N}(\mu_i n_i) \quad (eq. 5)$$

where
$\mu_i$ = Chemical Potential of the specie i,
$n_i$ = Equilibrium mole composition of specie i, $G^T$=Overall Gibbs free energy of the system at a given temperature, pressure, and molar composition.
N=Total number of components in the system.
The chemical potential of the specie i is given by:

$$\mu_i = \Delta G^0_{fi} + RT\ln\left(y_i \hat{\Phi}_i \frac{P}{P_0}\right) \quad \text{(eq. 6)}$$

$\Delta G^0_{fi}$ = Standard Gibbs free energy of formation of each specie $i$,

Incorporating the equation above into the total Gibbs free energy of the system as follows:

$$G^T = \sum_{i=1}^{N} n_i\left(\Delta G^0_{fi} + RT\ln\left(y_i\frac{\hat{\Phi}_i P}{P_0}\right)\right) \quad \text{(eq. 7)}$$

In addition to this, the overall Gibbs free energy of the system includes the Gibbs free energy of solid carbon formation as carbon in solid phase is one of the products from the reforming reaction. The overall Gibbs free energy equation therefore becomes:

$$G^T = \sum_{i=1}^{N} n_i\left(\Delta G^0_{fi} + RT\ln\left(y_i\frac{\hat{\Phi}_i P}{P_0}\right)\right) + n_c \Delta G^0_{fc(s)} \quad \text{(eq. 8)}$$

where $n_c$=number of moles of carbon produced at equilibrium.
A mass balance constraint is applied to the above equation to ensure an appropriate solution that satisfies conservation of mass of the control volume:

$$\Sigma_i n_i a_{ik} = A_k \quad \text{(eq. 10)}$$

where $A_k$=Total mass of the $k^{th}$ element, and
$a_{ik}$=Number of atoms of the $k^{th}$ element.

The inventors used a built in MATLAB® tool 'fmincon' to devise a method to find global minima of the Gibbs free energy equation. For each calculation set, the operating temperature and pressure were kept constant, and equilibrium moles were varied to get a minima in Gibbs free energy equation that ensures thermodynamic equilibrium. Each calculation set was subjected to mass balance constraint as stated above in eq. 10. The model for equilibrium calculation could be considered as a Gibbs reactor that provides equilibrium composition of the reaction species at specified operating condition.

Figure 3:
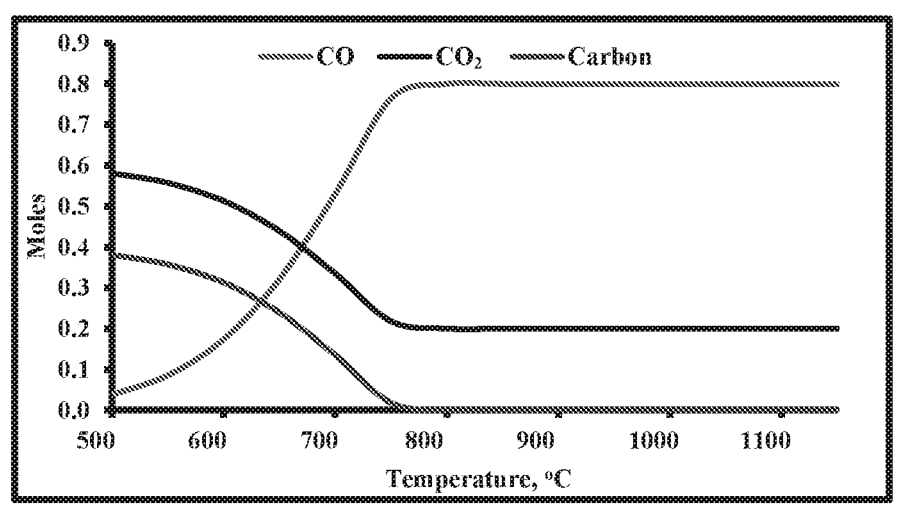
FIG. 3 shows thermodynamic equilibrium composition for the reaction of $CO_2$ with carbon.

The reaction species for the present invention include $CO_2$, CO and solid carbon modeled as graphitic carbon. According to the thermodynamic equilibrium model, 1.5 moles of $CO_2$ was fed to Gibbs reactor containing 1 mole of solid carbon. The temperature was varied from 500° C. to 900° C. with an increment of 50° C. at 1 bar pressure. FIG. 3 shows that the only product produced from this reaction was carbon monoxide. Also, the decrease in molar concentration of $CO_2$ and carbon indicates that they are being consumed as per the following stoichiometric equation:

$CO_2$+Carbon→2CO     (eq. 4)

As shown in FIG. 3, the reaction is feasible above 500° C., and a complete conversion of carbon is possible at a temperature above 900° C.

EXAMPLES

The thermodynamic feasibility of the present invention has been confirmed by the experiments described in detail below. In the experiments, the inventors tested the reaction of solid coke deposited on spent DRM catalyst with pure $CO_2$. Specifically, an experiment was conducted on a spent DRM catalyst (20% Ni/γ-Al$_2$O$_3$) using the regeneration procedure according to the present invention. The results showed mainly production of CO from a typical system. The inventors also conducted a series of operation and regeneration cycles for both DRM and CARGEN reactions to compare the efficacy of the present invention to the conventional regeneration technique. Details of these experiments including detailed description of the used setup and the adopted quality management system, as well as the results, are discussed below.

Figure 4:
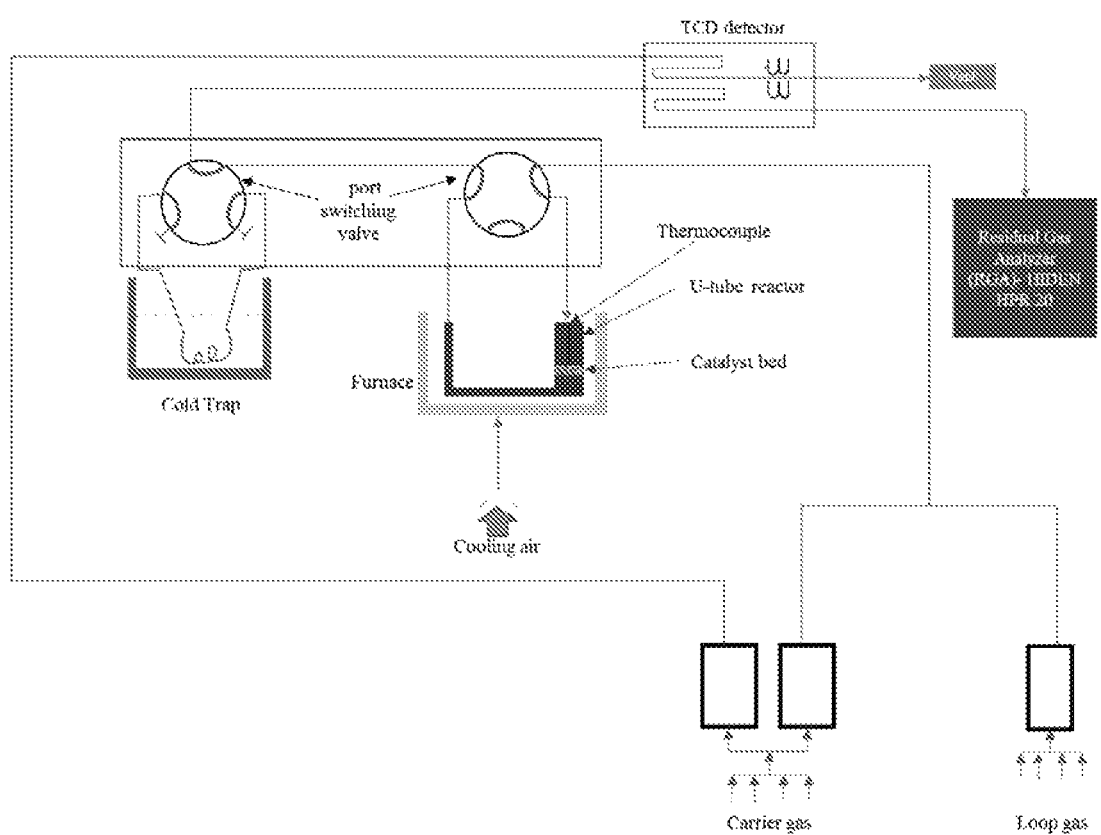
FIG. 4 is an instrumental setup of Micromeritics Autochem 2920 system connected to RGA.

For all the experimental tests, a flow through Quartz U-tube reactor of Micromeritics™ Autochem 2920 setup (FIG. 4) was used. A sheath type thermocouple touching the top of the catalyst bed was installed to monitor the temperature of the catalytic bed. The reactor loaded with catalyst was encapsulated inside a clamshell type furnace which could be heated up to the desired reaction temperature. All gas flows were controlled by built-in Mass Flow Controllers (MFC). The Micromeritics™ Autochem 2920 setup has a built-in Thermal Conductivity Detector (TCD) to analyze the adsorbed gas quantity on the catalyst which is sufficient for conducting catalyst in situ testing study.

The inventors used the Micromeritics™ Autochem 2920 as a labscale reactor connected to an RGA as the TCD detector alone cannot be used to analyze the composition of the produced gases from the reaction. Therefore, the outlet of the reactor is connected to RGA (Hiden, model HPR-20) to analyze the evolved gases qualitatively as well as quantitatively. To quantify the gas concertation of the evolved gases, static Response Sensitivity (RS) factors were used for different gases, while Argon was used as an internal standard (2 vol %) to ensure the accuracy of the quantification of the gas composition. In addition, the RGA was recalibrated prior to each experimental run to avoid drifting of the detected partial pressures of the gases.

Example 1: Confirmation of the Reaction Mechanism

In Example 1, a spent DRM catalyst containing significant quantity of coke was loaded, and purged with inert gas to get rid of the physisorbed DRM gas. Next, the reactor temperature was ramped up to 650° C. under a steady flow of inert gas. When only the inert gas was detected in RGA, it confirmed that complete purging was achieved. Pure $CO_2$ gas was then introduced at a flow rate of 48 ml/min to the isothermal reactor. The temperature of the reactor was then ramped up to 950° C. at a rate of 50° C./min and subsequently held at this condition for 10 minutes.

Figure 5:
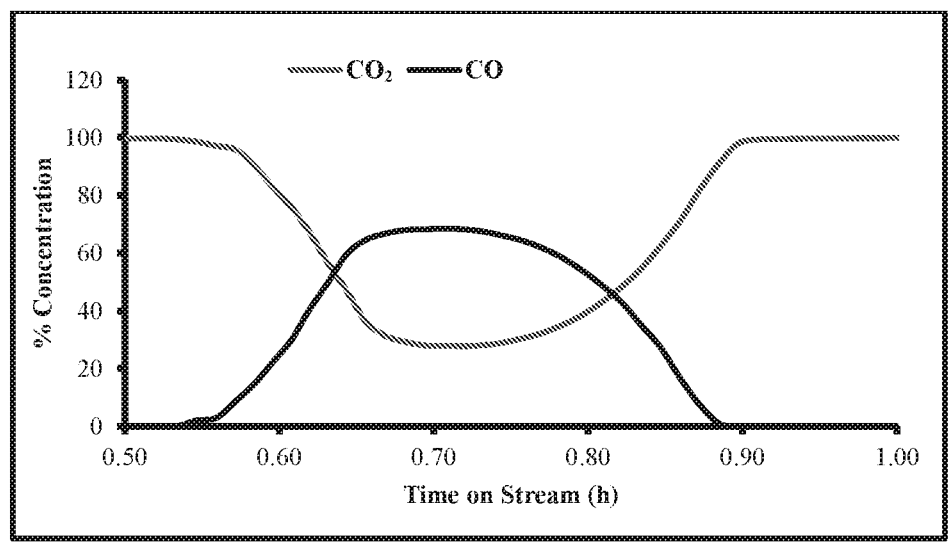
FIG. 5 shows RGA provided concentration plot of the $CO_2$ and CO gases during a single regeneration cycle in Example 1

It can be clearly observed from FIG. 5 that CO formation began immediately after $CO_2$ introduction. Initially, CO concentration started increasing rapidly with increase in temperature hinting rapid oxidation of coke by $CO_2$. After reaching a maximum composition of about 70% in the emerging gas mix, the CO concentration dropped steadily to a zero level confirming complete removal of coke. At the same time, opposite trend was noticed on the $CO_2$ composition. Two Gaussian peaks can be observed in FIG. 5, including a normal Gaussian peak corresponds to total CO formation and an inverted Gaussian peak corresponds to $CO_2$ consumption during the regeneration step. This indicates that CO was formed at the expense of $CO_2$ in the reaction with carbon. Since the catalyst surface is now cleaned and free from carbon, the catalyst could be used for the next operation cycle, which was demonstrated in the subsequent experiments.

Example 2: DRM and CARGEN Catalyst Regeneration/Reactivation

Next, the cycles of operation for typical DRM and CARGEN reactors were tested. The experimental results have proved that the catalyst activity can be recovered back to the fresh catalyst activity after each regeneration cycle. The experiments described herein demonstrated this recovery up to at least five cycles of operation.

To demonstrate the difference between the conventional regeneration method (oxidation of carbon using $O_2$) and the present invention, a comparative example using the conventional method is described below as Comparative Example 2.1. The experiments testing the DRM and CARGEN reaction cycles of operation are provided in Example 2.2 and Example 2.3 respectively.

Comparative Example 2.1: Conventional Regeneration Technique

In a DRM process, the spent catalyst is generally regenerated using $O_2$-TPO. In this conventional regeneration process, carbon deposited on a spent catalyst is "burnt off" as $CO_2$ by reaction of pure $O_2$ gas with carbon at high temperature conditions (700-800° C.). After a typical DRM process, the activity of the spent catalyst is revived by an $O_2$-TPO followed by $H_2$ Temperature Programmed Reduction (TPR). The catalyst was again exposed to the reaction gases to compare its activity with the previous cycle. In this comparative experiment, the inventors performed two sets of experiments on the same catalyst to compare the activity of the spent catalyst when it was regenerated using conventional $O_2$-TPO and when it was compared with the novel $CO_2$-TPO technique according to the present invention.

In a typical DRM and CARGEN experimental run, about 260 mg of sample was loaded in the U-tube quartz reactor, which was connected to the Micromeritics™ 2920 setup. In-situ reduction of the catalyst was performed under 50 mL/min flow of 10% $H_2$ in Ar mixture for 3 h at 700° C. with a ramp rate of 2° C./min. After reduction of the catalyst, the reactor was purged with He for 2 h and cooled to reaction temperature of 550° C. Feed gas including $CH_4$, $CO_2$, Argon (Ar), Helium (He) and $O_2$ (as required in typical DRM/CARGEN reaction) was introduced at a specific flow rate in the range of 30 to 250 ml/min to the quartz tube reactor from the carrier port of the Micromeritics™ 2920 system.

A blank run without any catalyst was recorded in the RGA by keeping Micromeritics™ 2920 system in reactor bypass mode to determine the inlet gas composition. Next, the reactant gases were introduced to the reactor tube at 550° C. containing a quartz silica bed to confirm that there was no contribution from the homogeneous reaction. After this control experiment run, the mixed gas was introduced to hot quartz reactor tube loaded with in-situ reduced 20% Ni/-$\gamma Al_2O_3$ catalyst. DRM reaction was conducted for predefined Time on Stream (TOS), and the reactor was purged with an inert gas.

Figure 6:
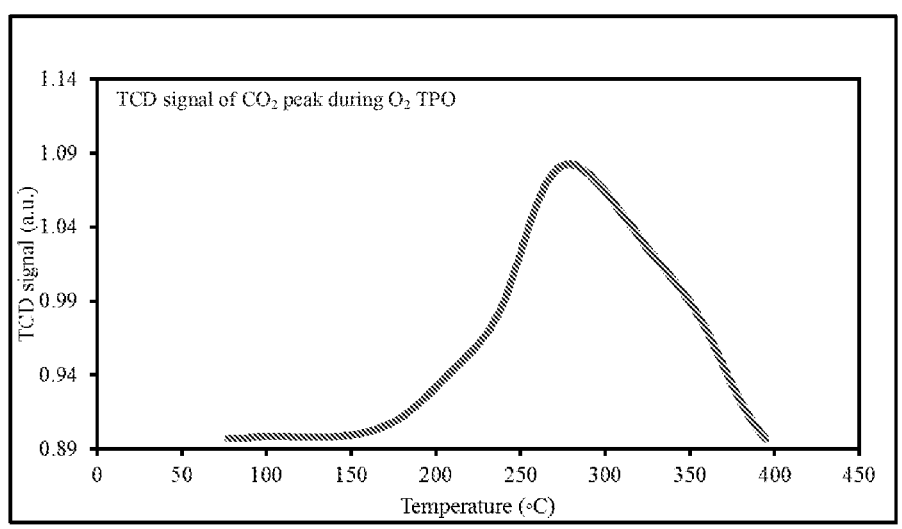
FIG. 6 shows TCD signal of $O_2$-TPO of the 20% Ni/-$\gamma Al_2O_3$ catalyst.

The conventional $O_2$-TPO was performed with 10% $O_2$ in He gas at 800° C. A visual inspection of the spent catalyst after each TPO indicated that the $Ni^0$ oxidized (metallic gray) to inactive NiO (green color). Additionally, formation of coke was confirmed by broad TPO peak of the evolved $CO_2$ detected in TCD signal as shown in FIG. 6.

To recycle the catalyst, in-situ TPR was performed again, and the DRM and CARGEN reactions was conducted with the mix gas to achieve a comparable $CO_2$ and $CH_4$ conversion compared to fresh catalyst cycle. These are discussed in detail below.

Example 2.2: DRM Catalyst Regeneration

Figure 7:
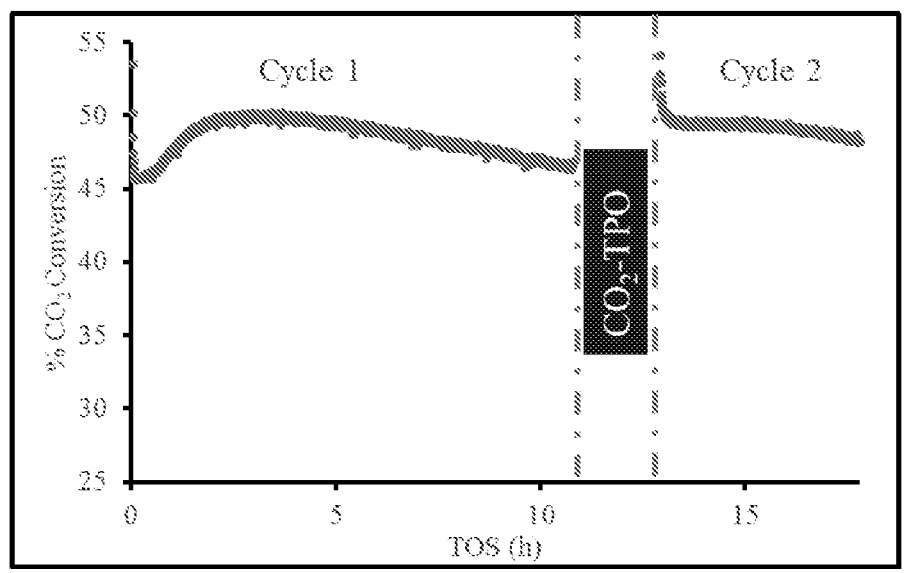
FIG. 7 shows $CO_2$% conversion during two cycles of DRM reaction with intermediate $CO_2$-TPO regeneration.

In the novel regeneration run, about 260 mg of commercial 20% Ni/-$\gamma Al_2O_3$ catalyst was mixed with 500 mg of quartz silica and loaded in the U-tube quartz reactor connected to a Micrometrics™ 2920 setup. In-situ reduction of the catalyst was performed as mentioned in the previous section. After complete reduction of the catalyst, the reactor was purged with Helium for 2 h, and cooled to reaction temperature of 550° C. Feed gas of 15% $CH_4$, 10% $CO_2$, 83% He, and 2% Ar was introduced at a rate of 248 ml/min to the quartz tube reactor from the carrier port of the Micrometrics system. DRM reaction was conducted for next 10 h of TOS and then purged with Helium for 30 minutes. The TPO was performed with pure $CO_2$ gas at 650° C. for 1 hour, and the regeneration reaction (eq.4) was confirmed by evolution of CO peak followed by the return of the base line peak in the RGA (FIG. 7). Immediately after the $CO_2$-TPO, the reactor was cooled to 550° C. while being purged with Helium.

After this, the second operation cycle was started by introducing the gas mixture, and DRM reaction was performed for next 5 hours TOS. It can be noted in FIG. 7 that the activity trend of $CO_2$% conversion in the second cycle of operation is in the same range (~50%) as that of the first cycle after a regeneration cycle using pure $CO_2$. This demonstrates that the catalyst activity does not get affected after the regeneration cycle.

Example 2.3: CARGEN Catalyst Regeneration

Figure 8:
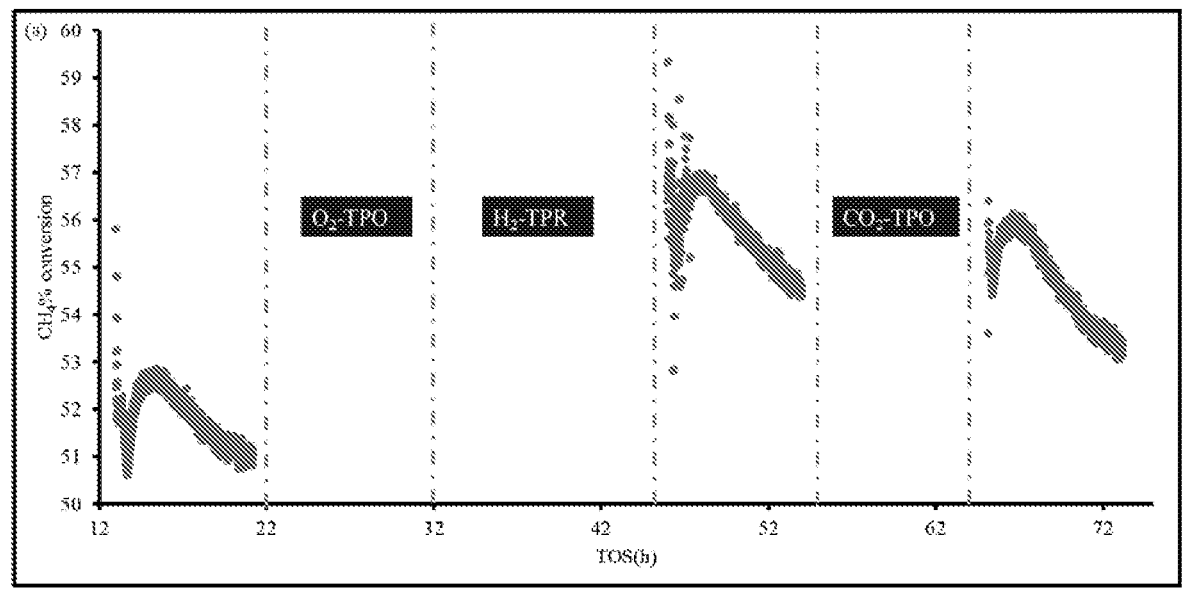
FIG. 8 shows $CH_4$% conversion comparison between the conventional regeneration procedure ($O_2$ TPO+$H_2$ TPR) Vs proposed novel regeneration technique ($CO_2$-TPO).
Figure 9:
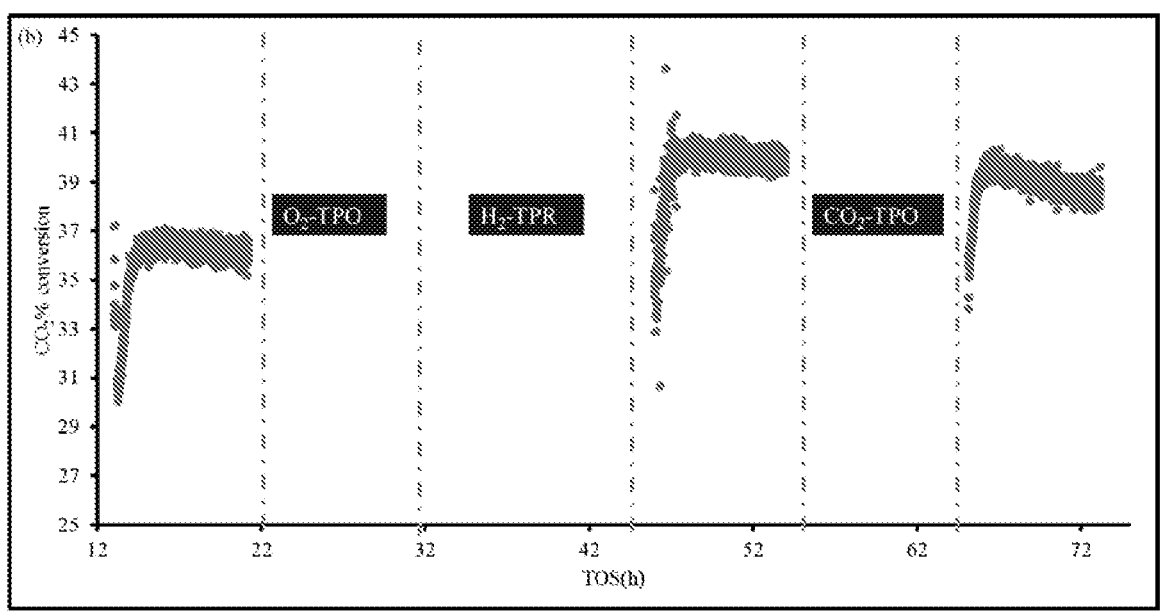
FIG. 9 shows $CO_2$% conversion comparison between the conventional regeneration procedure ($O_2$ TPO+$H_2$ TPR) Vs proposed novel regeneration technique ($CO_2$-TPO).

In this experiment, the inventors monitored the activity of the catalyst in terms of $CH_4$% conversion and $CO_2$% conversion during each cycle of operation. FIGS. 8 and 9 show the comparison between the activities of the CARGEN reaction when both regeneration techniques were performed. Similar to the process in the previous example, about 0.260 g of commercial 20% Ni/$\gamma$-$Al_2O_3$ catalyst was reduced with 10% $H_2$ in 90% Ar at 700° C. for 2 h. Subsequently, the temperature was ramped down to 550° C. of reaction condition under He flow. CARGEN reaction was initiated by introduction of mix gas of 30% $CH_4$, 18% $CO_2$, 3% $O_2$, 47% He, and 2% Ar at a flow of 78 ml/min.

RGA was used to monitor the composition of the evolved gases, and conversions of $CH_4$ and $CO_2$, as shown in FIGS. 8 and 9, were evaluated using mass balance. It can be observed that the $CH_4$ conversion of about 52% was achieved, while a conversion of about 36% was achieved for $CO_2$.

The reaction was continued for a TOS of about 9 h, and then TPO was performed by using 10% $O_2$ in 90% He for 2 h at 800° C. After complete oxidation with $O_2$ for 2 h, the oxidized catalyst was reduced with 10% $H_2$ in 90% Ar for the next 2 h. Second cycle of CARGEN reaction was initiated and was continued for the next 8 h. It was observed that the activity of $CH_4$ and $CO_2$ (about 55% and 39%, respectively) was retained back to the value obtained in previous cycle.

Next, the reaction was stopped and the reactor temperature was ramped up to 650° C. while purging with Helium gas followed by the proposed $CO_2$-TPO regeneration for 10 minutes. A CO peak was observed in RGA unit during CO$_2$-TPO regeneration cycle indicating the removal of carbon deposited during the operation cycle as per eqn. 4.

Next, temperature was ramped down to 550° C. under He flow, and then CARGEN reaction was initiated again at 78 ml/min of the mix gas composition. It could be observed that the activity of the catalyst was retained back to the original conversion level of about 55% in CH$_4$ and 39% in CO$_2$. This shows that the proposed regeneration procedure was able to remove solid carbon as CO and was also able to retain the activity of the catalyst back to the original state.

Results of all these experiments demonstrate that regeneration of the DRM and CARGEN catalyst could effectively be conducted using CO$_2$ as an oxidant, which not only reduces the number of steps required during regeneration, but also serves as a process to produce CO.

Compared to the conventional regeneration procedure including two steps of oxidation with O$_2$ and reduction with H$_2$, the regeneration procedure according to the present invention utilized a greenhouse gas (CO$_2$) for regeneration. Also, compared to the regeneration time of 4 h (2 h of oxidation and 2 h of reduction) required in a conventional procedure, the regeneration technique according to the present invention requires only 10 minutes, which results in significant reduction in the downtime of the reactor.

The inventors have also recognized that a similar regeneration process could be applied using H$_2$ gas to convert carbon deposited during DRM reaction and CARGEN to CH$_4$. However, using CO$_2$ for regeneration may be preferable because a) CO$_2$ is a greenhouse gas, b) special production facility for H$_2$ and O$_2$ is not required, c) time required for regeneration is significantly lower compared to conventional regeneration procedure involving O$_2$ and H$_2$, and d) produced CO has significantly high commercial value.

It should be understood that various changes and modifications to the presently preferred embodiments described herein will be apparent to those skilled in the art. The parameters used in the examples disclosed herein can be adjusted accordingly, and any parameters, such as reaction temperatures and durations, suitable for the reactions according to the present invention may be used. Such changes and modifications can be made without departing from the spirit and scope of the present subject matter and without diminishing its intended advantages. It is therefore intended that such changes and modifications be covered by the appended claims.

The invention claimed is:

1. A method of regenerating or reactivating a catalyst used in a reforming reaction, the method comprising:
    providing the catalyst in a reactor, wherein the catalyst was used in a carbon and syngas production reaction;
    providing a first oxidizing gas comprising CO$_2$ to the reactor for regeneration or reactivation of the catalyst; and
    providing to the reactor a second oxidizing gas comprising CO$_2$ and O$_2$ for the regeneration or reactivation of the catalyst,
    wherein the catalyst is not further reduced for the regeneration or reactivation of the catalyst.

2. The method of claim 1, wherein the carbon and syngas production reaction is a Dry Reforming of Methane reaction or a CARGEN reaction, and the catalyst comprises solid carbon produced from the Dry Reforming of Methane reaction or the CARGEN reaction.

3. The method of claim 1, wherein the catalyst comprises nickel as an active metal.

4. The method of claim 1, wherein the catalyst is deactivated from the carbon and syngas production reaction or has an activity less than that before being used in the carbon and syngas production.

5. The method of claim 1 further comprising producing pure CO from the regeneration or reactivation of the catalyst.

6. The method of claim 1, wherein the regeneration or reactivation of the catalyst is conducted at a temperature from about 650° C. to about 900° C.

7. The method of claim 5, wherein the regeneration or reactivation of the catalyst has a duration from about 10 minutes to about 4 hours or until the CO generation diminishes to zero while regeneration or reactivation.

8. A process comprising:
    providing a first catalyst in a first reactor for a first carbon and syngas production reaction;
    providing a first mixed gas comprising CH$_4$ and CO$_2$ in the first reactor for the first carbon and syngas production reaction;
    allowing a first reacted gas from the first carbon and syngas production reaction to leave the first reactor; and
    providing a first oxidizing gas comprising CO$_2$ to the first reactor for a first regeneration or reactivation of the first catalyst,
    wherein the first catalyst is not further reduced for the first regeneration or reactivation of the first catalyst.

9. The process of claim 8, wherein the first carbon and syngas production reaction is a first Dry Reforming of Methane reaction or a first CARGEN reaction.

10. The process of claim 8, further comprising:
    providing a second catalyst in a second reactor for a second carbon and syngas production reaction;
    providing a second mixed gas comprising CH$_4$ and CO$_2$ in the second reactor for the second carbon and syngas production reaction;
    allowing a second reacted gas from the second carbon and syngas production reaction to leave the second reactor; and
    providing a second oxidizing gas comprising CO$_2$ to the second reactor for a second regeneration or reactivation of the first catalyst,
    wherein the second catalyst is not further reduced for the second regeneration or reactivation of the second catalyst.

11. The process of claim 10, wherein the second carbon and syngas production reaction is a second Dry Reforming of Methane reaction or a second CARGEN reaction.

12. The process of claim 8, wherein the first catalyst comprises nickel as an active metal.

13. The method of claim 8 further comprising providing to the first reactor a first additional oxidizing gas comprising CO$_2$ and O$_2$ for the first regeneration or reactivation of the first catalyst.

14. The process of claim 8 further comprising producing pure CO from the first regeneration or reactivation of the first catalyst.

15. The process of claim 10, wherein the second catalyst comprises nickel as an active metal.

16. The process of claim 10, wherein the second oxidizing gas further comprises O$_2$.

17. The method of claim 10 further comprising providing to the second reactor a second additional oxidizing gas comprising CO$_2$ and O$_2$ for the second regeneration or reactivation of the second catalyst.

18. The process of claim 10 further comprising producing pure CO from the second regeneration or reactivation of the second catalyst.

19. A process comprising:
- providing a first catalyst in a first reactor for a first Dry Reforming of Methane reaction or a first CARGEN reaction;
- providing a first mixed gas comprising $CH_4$ and $CO_2$ in the first reactor for the first Dry Reforming of Methane reaction or the first CARGEN reaction);
- allowing a first reacted gas from the first Dry Reforming of Methane reaction or the first CARGEN reaction to leave the first reactor;
- providing a first oxidizing gas comprising $CO_2$ to the first reactor for a first regeneration or reactivation reaction of the first catalyst;
- providing a second catalyst in a second reactor for a second Dry Reforming of Methane reaction or a second CARGEN reaction;
- providing a second mixed gas comprising $CH_4$ and $CO_2$ in the second reactor for the second Dry Reforming of Methane reaction or the second CARGEN reaction;
- allowing a second reacted gas from the second Dry Reforming of Methane reaction or the second CARGEN reaction to leave the second reactor;
- providing a second oxidizing gas comprising $CO_2$ to the second reactor for a second regeneration or reactivation reaction of the second catalyst.

20. The process of claim 19, wherein the first regeneration reaction of the first catalyst and the second Dry Reforming of Methane reaction or the second CARGEN reaction are about concurrent.

\* \* \* \* \*